Dec. 28, 1948.  F. A. WADE ET AL  2,457,332
EDUCATIONAL APPARATUS
Filed Feb. 5, 1947
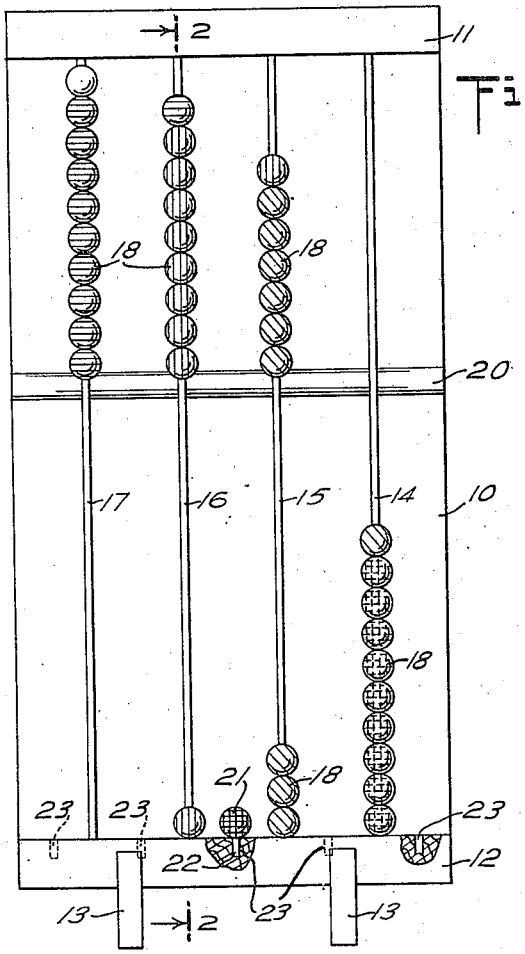
Fig. 1.
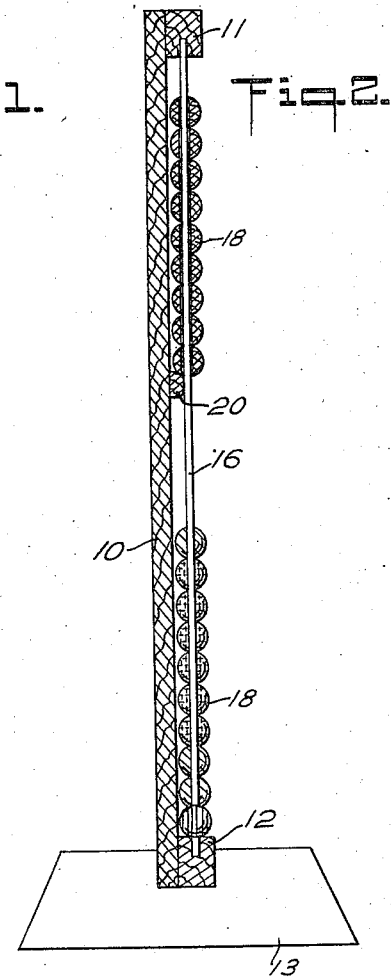
Fig. 2.
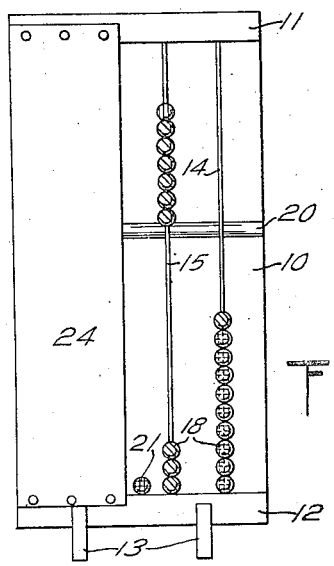
Fig. 3.
Fig. 4.
INVENTORS
FRANCIS A. WADE
WILLIAM METZNER
BY
Barr, Borden & Fox
ATTORNEYS Patented Dec. 28, 1948

2,457,332

UNITED STATES PATENT OFFICE 2,457,332

EDUCATIONAL APPARATUS

Francis A. Wade and William Metzner, Philadelphia, Pa.

Application February 5, 1947, Serial No. 726,478

2 Claims. (Cl. 35—33)

The present invention relates to educational apparatus and more particularly to an improved abacus.

Some of the objects of the present invention are: to provide an improved abacus to enable a teacher to more readily help pupils to understand our number system; to provide an abacus by which students will be able to perform such simple calculations as will make our number system understood; to provide an abacus wherein each digit of our number system, 1 to 9, is represented by the corresponding number of objects, such as beads, while a complete social unit of 10 is represented by using a tenth bead of different color from the nine, but of the same color as that used for the nine beads of the next higher order and to which the tenth bead really belongs; to provide a novel abacus wherein a decimal bead is employed and can be selectively positioned to show dollars and cents, or tenths, hundredths, and thousandths; to provide an abacus arranged for use in a vertical position, either suspended or mounted on a base, or used in a flat position; to provide an abacus in association with a mask or shield to define a restricted field of calculations; and to provide other improvements as will hereinafter appear.

In the accompanying drawings, Fig. 1 represents a front elevation of an abacus embodying one form of the present invention; Fig. 2 represents a section on line 2—2 of Fig. 1; Fig. 3 represents a perspective of one form of decimal unit; and Fig. 4 represents a front elevation of a modification of the abacus of the invention.

Referring to the drawings, one form of the present invention comprises a backing in the form of a panel 10 attached to a cross-piece 11 at its upper or top end and to a base crosspiece 12 at its lower end, the two pieces being on the same side of the panel 10 to form juxtaposed spaced parallel planar surfaces. This panel assembly is arranged to be supported in a vertical position by slotted feet members 13 into which the panel base 12 is inserted so that the panel will assume a standing position on a desk or table. The slotted assembly permits the panel assembly to be removed for use flat on a desk for study and use by a pupil, though generally it will be used vertically for use by the teacher in explaining calculations.

In the present instance the panel 10 forms a background for four vertically disposed wires 14, 15, 16 and 17 which are stretched taut between the two crosspieces 11 and 12 to form supports respectively for groups of calculating units, here shown in the form of beads 18, strung ten to a group on each of the aforesaid wires. A novel feature of the invention comprises identifying each group by a color different from the other groups, except that the tenth or uppermost bead of each group is colored to match the lower nine beads of the next group. Thus, viewing the panel from the front, the rows of bead groups, reading from right to left, represent respectively ones, tens, hundreds, and thousands, corresponding to the present-day number system. As here shown, the color system selected comprises in the one-group, nine yellow beads and an upper tenth green bead; the ten-group nine green beads and an upper tenth red bead; the hundreds-group nine red beads and an upper tenth blue bead; and the thousands-group nine blue beads and an upper tenth white bead. The invention is not limited to this particular color grouping, which is only illustrative; the essential color differentiation being that the tenth or upper bead of each group be of different color than the other nine of its group and of the same color as the nine beads of the next succeeding group. Thus, each upper or tenth bead indicates that it really belongs in the group of next higher order.

In order to visually operate the several groups of beads, the panel 10 is subdivided by a support strip 20 attached to the face of the panel 10 and parallel to the base piece 12, being so located between the two pieces 11 and 12 as to provide an upper bead-retaining section of a length sufficient to permit all four groups of beads to be stored thereagainst and a lower section of a length to permit all beads of each group to be moved downward thereagainst for demonstration purposes. In other words, the upper section serves for storage purposes from which the beads can be removed singly or in groups to the lower demonstrating section. It should be noted that the support strip 20 projects into abutting relation to the four wires, and thus forms a support substantially equal to the radius of the beads. By slightly flexing each wire, one or more beads can be readily passed over the strip 20 and allowed to drop into position in front of the lower section of the panel.

For the purpose of indicating decimal points, a supplemental or decimal bead 21, here shown as black, is provided, the same being mounted upon a pin 22 for insertion in any one of holes 23 formed in the base piece 12 at points respectively between the wires so that any wire may become units, tens, tenths, etc. When not in use, the bead 21 is stored in an end hole where it will not confuse the student.

In the form of the invention shown in Fig. 4, the panel and its associated parts are the same as heretofore described, but, in this instance, the panel is provided with a mask or shield 24 which can be moved to certain selected positions in order to conceal certain of the vertical groups or rows of beads while leaving others visible for teaching purposes. Thus, for simple calculations the mask 24 will cover all but one or two of the rows, and since the others can not be seen, the student is not confused or distracted by such rows or groups as are not in use at the moment.

It will now be apparent that a complete unitary abacus has been devised having four vertical wires with groups of beads representing one, tens, hundreds, and thousands, and/or tenths, hundredths, thousandths, ten-thousandths. On each wire are nine beads of the same color with a top tenth bead of the next succeeding color. This tenth thus completes the ten and shows by its color that ten beads are equal to one of the next higher order.

The abacus is large enough to be readily visible in the average classroom. It is furnished with detachable supports so that it may be placed vertically on the teacher's table or desk for class demonstration or for pupil use. The abacus may be hung on the wall with screw eyes when not in use. The ingenious strip 20 prevents the beads from falling. An extra bead or block may be used as a movable decimal point or for United States money.

The modernized abacus presents place value functionally and emphasizes the use of ten in our number system. This type of abacus gives an accurate picture of our way of representing quantities by the symbols 0 to 9 with each succeeding order having ten times the value of the preceding one. An abacus with beads in a vertical position is superior to one with horizontal beads, because the positions of its successive rows of beads correspond to the place value of the written numbers in the Hindu-Arabic system.

The abacus of the present invention is used as follows:

Counting: Counting by ones beyond 10; by tens to 100; by hundreds to 1000; by thousands to 10,000.

Place value: Reading or writing numbers to 10,000 from the abacus; setting dictated or written numbers on the abacus; special attention to zero as a place holder when there are no ones, tens, etc.

Practice with tens: The number facts in addition (and subtraction) to 18 should be demonstrated thoroughly on the abacus. The children must learn how that one bead on the second wire or order means ten; in previous concrete experiences ten was shown by ten single objects. Similar practice with hundreds is possible.

Addition without carrying and subtraction without borrowing: Children benefit by seeing these operations on the abacus. Adding tens to tens and ones to ones gives practice in the easier addition combinations in a different situation as well as practice in place value. Subtraction is best demonstrated on this type of abacus by placing the minuend at the bottom of the wires and moving beads upward to subtract.

Addition with carrying: When the tenth bead comes down in adding, a bead of the next higher order is moved down, and all the first ten are moved up.

Subtraction with borrowing (taking and using): Procedures used in carrying are reversed.

U. S. money and decimals: Columns may be called pennies, dimes, etc., or ones, tenths, etc. Use the movable bead or block for the decimal point.

Division: Division by one place divisors may be illustrated on the abacus simultaneously with written work to make the ideas of place value concrete.

Multiplication: Easy multiplication as repeated addition, 6×20, shows progression to the next order.

Having thus described our invention, we claim:

1. An abacus comprising the combination of a panel, a plurality of vertically disposed denominationally ordered wires carried by said panel forming spaced rows, a group of ten beads strung on each wire for sliding movement relative thereto, the top bead of each group being visually distinguishable from the nine below it but visually identical with the lower nine beads in the group of the next adjacent higher order, and a horizontal support on said panel intermediate the length thereof for supporting all bead groups, in such a way that flexing any wire releases and drops a selected number of beads from said support to form a sequence supported by the bottom of said panel and corresponding to a selected number readable as a place value.

2. An abacus comprising the combination of a panel having top and bottom members in juxtaposed position, means to support said panel in a vertical position, a plurality of vertically disposed denominationally ordered wires stretched between said members to form spaced rows, a support strip horizontally subdividing said panel into upper and lower sections, said strip being in substantial abutting relation to said wires, and groups of beads strung respectively on said wires for movement from one panel section to the other, said strip supporting any beads moved into said upper section but permitting release of any beads by flexing said wires, each bead group comprising ten beads, the top bead thereof being visually distinguishable from the nine below but visually identical with the lower nine beads in the group of the next adjacent higher order.

FRANCIS A. WADE.
WILLIAM METZNER.

REFERENCES CITED

The following references are of record in the file of this patent:

UNITED STATES PATENTS

| Number | Name | Date |
|---|---|---|
| 232,482 | Fitch | Sept. 21, 1880 |
| 352,218 | Bolton et al. | Nov. 9, 1886 |
| 452,302 | Denison | May 12, 1891 |
| 487,695 | Collins | Dec. 6, 1892 |
| 637,964 | Johnsen | Nov. 28, 1899 |
| 1,863,927 | Konno | June 21, 1932 |
| 2,228,554 | Brown | Jan. 14, 1941 |

FOREIGN PATENTS

| Number | Country | Date |
|---|---|---|
| 59,455 | Austria | June 10, 1913 |
| 820,386 | France | July 26, 1937 |